(12) United States Patent
Kritt et al.

(10) Patent No.: US 9,824,373 B2
(45) Date of Patent: Nov. 21, 2017

(54) MOBILE DEVICE CLUSTER ADVERTISEMENT DELIVERY

(71) Applicant: International Business Machines Corporation, Armonk, NY (US)

(72) Inventors: Barry A Kritt, Raleigh, NC (US); Sarbajit K Rakshit, Kolkata (IN); Shawn K Sremaniak, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 13/781,626

(22) Filed: Feb. 28, 2013

(65) Prior Publication Data
US 2013/0232010 A1    Sep. 5, 2013

Related U.S. Application Data

(63) Continuation of application No. 13/410,913, filed on Mar. 2, 2012.

(51) Int. Cl.
*G06Q 30/00* (2012.01)
*G06Q 30/02* (2012.01)

(52) U.S. Cl.
CPC .............................. *G06Q 30/0267* (2013.01)

(58) Field of Classification Search
USPC ......................................................... 705/14
See application file for complete search history.

(56) References Cited

U.S. PATENT DOCUMENTS

| | | | |
|---|---|---|---|
| 7,343,317 | B2 | 3/2008 | Jokinen et al. |
| 2003/0096621 | A1 | 5/2003 | Jana et al. |
| 2008/0054072 | A1 | 3/2008 | Katragadda |
| 2008/0133336 | A1 | 6/2008 | Altman et al. |
| 2010/0159943 | A1 | 6/2010 | Salmon |
| 2010/0161720 | A1* | 6/2010 | Colligan et al. ............... 709/203 |
| 2011/0040603 | A1* | 2/2011 | Wolfe ............................. 705/10 |
| 2011/0082752 | A1 | 4/2011 | Dube et al. |
| 2011/0312344 | A1 | 12/2011 | Mccahill et al. |
| 2011/0320259 | A1* | 12/2011 | Roumeliotis et al. ..... 705/14.41 |

(Continued)

FOREIGN PATENT DOCUMENTS

| | | |
|---|---|---|
| CN | 101645154 A | 2/2010 |
| CN | 102215461 A | 10/2011 |

OTHER PUBLICATIONS

PCT/IB2013/051005, International Search Report and Written Opinion, Jul. 4, 2013.

(Continued)

*Primary Examiner* — Alvin L Brown
(74) *Attorney, Agent, or Firm* — Kunzler Law Group; Steven Bennett

(57) ABSTRACT

Methods provide advertisement delivery to a cluster of mobile devices with computer readable program code, when read by a processor, configured for identifying, among a plurality of mobile devices associated with a network, a cluster of two or more mobile devices. The identification may be based at least in part on a relative displacement of the two or more mobile devices during a period of time being less than a maximum relative displacement. The methods may further include displaying an advertising message on each mobile device in the cluster.

8 Claims, 8 Drawing Sheets

(56) References Cited

U.S. PATENT DOCUMENTS

2012/0130796 A1    5/2012  Busch
2012/0316938 A1*  12/2012  Moshfeghi ................ 705/14.16
2013/0262203 A1*  10/2013  Frederick et al. ......... 705/14.12

OTHER PUBLICATIONS

Wikipedia, Cluster Analysis, http://en.wikipedia.org/wiki/Cluster_analysis, Last modified Jul. 19, 2013.
Wendy Suto, Internet Marketing Strategies That Ger Results—Targeted Ads, Ezine ©rticles, http://ezinearticles.com/?Internet-Marketing-Strategies-That-Get-Results---Targeted-Ads&id=4487280, Jun. 15, 2010.
Business Mantra, http://www.businessmantra.net/is-targeted-advertising-in.html, Jan. 8, 2010.
http://news.yahoo.com/yahoo-labs-forms-group-target-advertising-20110203-063020-075.html, Feb. 3, 2011.
U.S. Appl. No. 13/410,913, Office Action, dated May 6, 2015.

* cited by examiner

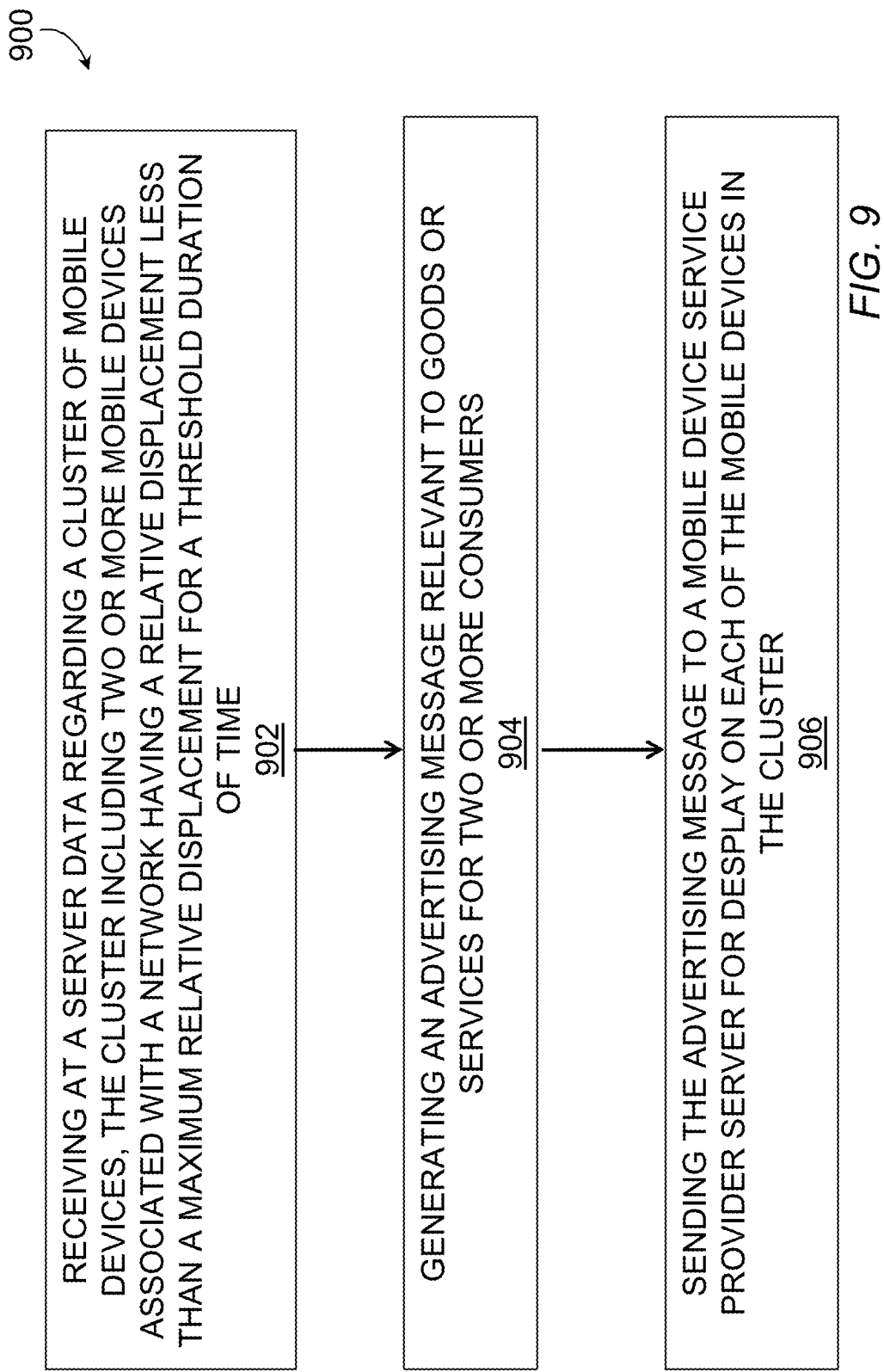

MOBILE DEVICE CLUSTER ADVERTISEMENT DELIVERY

CROSS-REFERENCE TO RELATED APPLICATION

This application is a continuation of U.S. patent application Ser. No. 13/410,913, filed Mar. 2, 2012, which is incorporated herein by reference in its entirety for all purposes.

BACKGROUND

The present invention relates to mobile device advertisement delivery, and more specifically, to advertisement delivery to a cluster of mobile devices.

Generally, advertising is a form of communication used to encourage or persuade a consumer to continue or take some new action. An advertisement may be delivered to an advertisement display medium, for example, to a mobile device. Targeted advertising usually includes a type of advertising whereby advertisements are placed so as to reach a consumer based on various traits such as gender, age and/or other demographic information. Typically, the advertisement display medium, such as the mobile device, is delivered an advertisement or targeted advertisement on an individual person or consumer basis.

BRIEF SUMMARY

According to one embodiment of the present invention, a method, implemented in a computer system, of advertisement delivery to a cluster of mobile devices is provided. The method may include identifying among a plurality of mobile devices associated with a network a cluster of two or more mobile devices. The identification may be based at least in part on a relative displacement of the two or more mobile devices during a period of time being less than a maximum relative displacement. The method may further include displaying an advertising message on each mobile device in the cluster.

In some embodiments of the present invention, the method may further include capturing data regarding the cluster, the data including at least one of a time of day and a location of the cluster, sending the data to a server and/or receiving the advertising message from the server. The advertising message may be relevant to goods or services for two or more consumers. Some embodiments of the method may include determining a movement speed of the cluster, wherein the advertising message is relevant to the speed of the cluster. Some embodiments of the method may include determining a movement speed of the cluster and determining a projected location of the cluster, wherein the advertising message is relevant to the projected location of the cluster.

Additionally and/or alternatively, some embodiments may include a method, wherein the network includes a peer-to-peer network and the identification is based at least in part on a common user profile factor of the two or more mobile devices. Additionally and/or alternatively, the identification of the cluster may include determining a distance between the two or more mobile devices to be less than a maximum distance.

According to another embodiment of the present invention, a method, implemented in a computer system, of advertisement delivery to a cluster of mobile devices is provided. The method may include identifying among a plurality of mobile devices associated with a network a cluster of two or more mobile devices, determining a movement speed of the cluster and displaying an advertising message on each mobile device in the cluster. The identification may be based at least in part on a distance between the two or more mobile devices being below a maximum distance.

In some embodiments of the present invention, the method may further include accessing a database storing user profiles of the plurality of mobile devices and determining a common user profile factor of the two or more mobile devices. The identification of the cluster may be based at least in part on the common user profile factor. Additionally and/or alternatively, the identification is based at least in part on the distance between the two or more mobile devices being below a maximum distance for a threshold duration of time. Some embodiments of the method may include capturing data regarding the cluster, the data including one or more of the time of day and the location of the cluster.

According to another embodiment of the present invention, a method, implemented in a computer system, of advertisement delivery to a cluster of mobile devices is provided. The method may include receiving at a server data regarding a cluster of mobile devices, generating an advertising message relevant to goods or services for two or more consumers and sending the advertising message to a mobile device service provider server for display on each of the mobile devices in the cluster. The cluster may include two or more mobile devices associated with a network having a relative displacement less than a maximum relative displacement for a threshold duration of time. Additionally and/or alternatively, in some embodiments, the data may include a movement speed of the cluster. Additionally and/or alternatively, in some embodiments, generating the advertising message may include applying a conditional rule to the data.

According to another embodiment of the present invention, a computer program product may include a computer readable storage medium having computer readable program code embodied therewith. The computer readable program code, when read by a processor, may be configured to identify among a plurality of mobile devices associated with a network a cluster of two or more mobile devices and display an advertising message on each mobile device in the cluster. The identification may be based at least in part on a relative displacement of the two or more mobile devices during a period of time being less than a maximum relative displacement.

In yet another embodiment of the present invention, a computer is provided. The computer may include a processor, a memory and/or a program including a plurality of instructions stored in the memory. The plurality of instructions may be executed by the processor to identify among a plurality of mobile devices associated with a network a cluster of two or more mobile devices and display an advertising message on each mobile device in the cluster. The identification may be based at least in part on a relative displacement of the two or more mobile devices during a period of time being less than a maximum relative displacement.

For some embodiments of the computer, the plurality of instructions may further include instructions capture data regarding the cluster, the data including at least one of a time of day and a location of the cluster, send the data to a server and receive the advertising message from the server. The advertising message may be relevant to goods or services for two or more consumers. Additionally and/or alternatively, the plurality of instructions may further include instructions to access a database storing user profiles of the plurality of mobile devices and determine a common user profile factor of the two or more mobile devices.

Additionally and/or alternatively, the plurality of instructions may further include instructions to determine a movement speed of the cluster, wherein the advertising message is relevant to the speed of the cluster. In some embodiments, the identification of the cluster may be based at least in part on the common user profile factor. Additionally and/or alternatively, the plurality of instructions may further include instructions to determine a movement speed of the cluster and determine a projected location of the cluster, wherein the advertising message is relevant to the projected location of the cluster.

BRIEF DESCRIPTION OF THE SEVERAL VIEWS OF THE DRAWINGS

FIG. 9 is an example of a method of advertisement delivery to a cluster of mobile devices.

DETAILED DESCRIPTION

Figure 1:
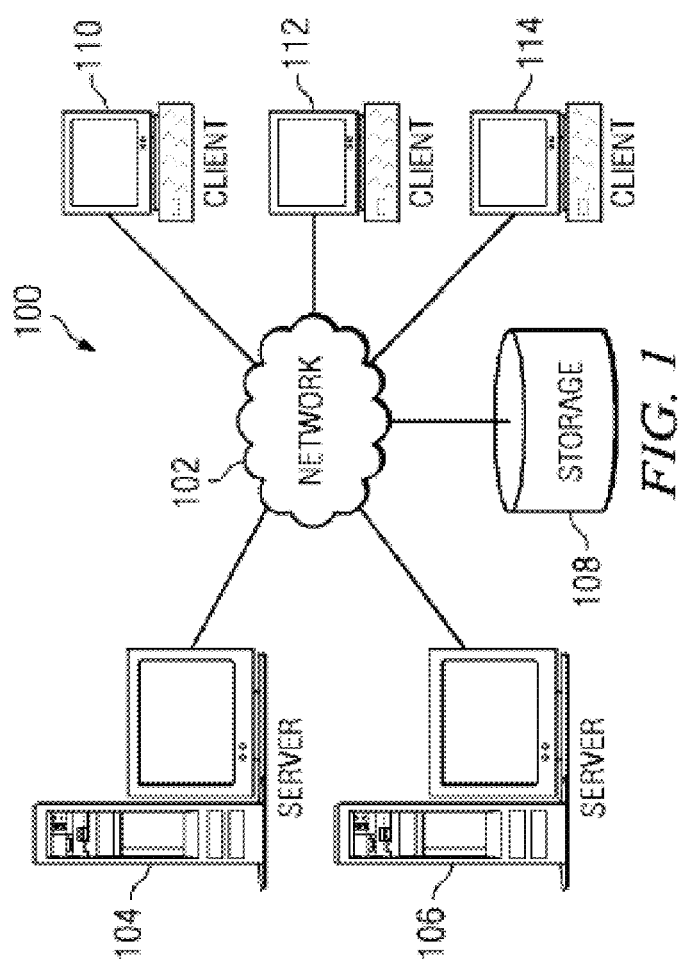
FIG. 1 is a pictorial representation of an example of a computer system in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF cable, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
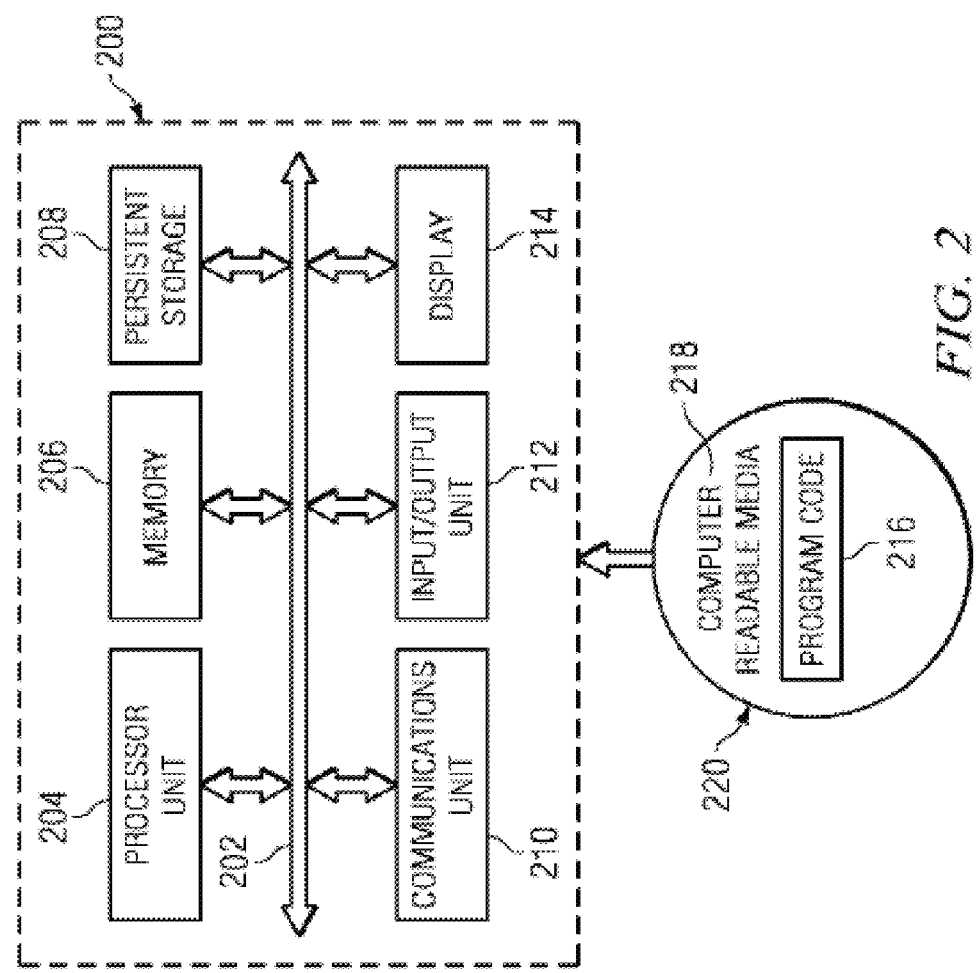
FIG. 2 is a block diagram of an example of a computer in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a computer system, indicated generally at 100, and including a network of computers in which illustrative embodiments may be implemented. Computer system 100 may contain a network 102, which is the medium used to provide communications links between various devices and computers connected together within computer system 100. Network 102 may include connections, such as wire, wireless communication links, or fiber optic cables.

In the depicted example, a server 104 and a server 106 may connect to network 102 along with a storage unit 108. In addition, a first client computer 110, a second client computer 112, and a third client computer 114 may connect to network 102. Client computers 110, 112, and 114 may be, for example, personal computers or network computers. In the depicted example, server 104 may provide data, such as boot files, operating system images, and/or software applications to client computers 110, 112, and 114. Client computers 110, 112, and 114 are clients to server 104 in this example. Computer system 100 may include additional servers, clients, and other devices not shown, or may include fewer devices than those shown.

In the depicted example, network 102 may be or may include the Internet. Computer system 100 also may be implemented with a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer or a computer system, such as a server, client computer, gaming system, personal digital assistant (pda), smart phone, mobile device or any other computer or device that functions like a computer, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 may serve to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device may include any piece of hardware that is capable of storing information either on a temporary basis and/or a permanent basis. Memory 206 may include, for example, a random access memory or any other suitable volatile or non-volatile storage device. Persistent storage 208 may take various forms depending on the particular implementation. For example, persistent storage 208 may contain one or more components or devices. For example, persistent storage 208 may include a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210 may provide for communications with other data processing systems or devices and/or one or more networks such as a local area network (LAN), a general wide area network (WAN), and/or a public network (e.g., the Internet). Some embodiments of communications unit 210 may include a network interface card. Communications unit 210 may provide communications through the use of either or both physical and wireless communications links.

Input/output unit 212 may allow for input and output of data with other devices that may be connected to data processing system 200. For example, input/output unit 212 may provide a connection for user input through a keyboard and mouse. Further, input/output unit 212 may send output to a printer. Display 214 may provide a mechanism to display information to a user.

Instructions for the operating system and applications or programs may be located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 may be located in a functional form on computer-readable media 218 that is selectively removable and may be loaded onto or transferred to data processing system 200 for execution by processor unit 204. Program code 216 and computer-readable media 218 may form computer program product 220. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 may include hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. The bus system may be implemented using any suitable type of architecture that provides for a transfer of data between different components or devices attached to the bus system. Additionally, a communications unit may include one or more devices used to transmit and receive data, such as a modem or a network adapter. Further, a memory may include, for example, memory 206 or a cache such as found in an interface and memory controller hub that maybe present in communications fabric 202.

A computer or computer system may receive and/or display an advertising message. For example, a mobile device may receive an advertising message, such as a short message service (SMS) and/or a multimedia messaging service (MMS) based advertisement. In some situations, the advertising message may be more effective if it is delivered to a group of people. For example, the advertising message may be relevant to goods or services for two or more consumers, such as "Two big Pizza with 2 liter free cold drink free." Such an advertisement may not be useful if delivered to a single person and/or a single mobile device. However, the advertising message relevant to goods or services for two or more consumers is useful if delivered to a group of two or more people.

Accordingly, the present invention may provide a mechanism by which group of people (travelling or sitting together) are identified and then an advertising message is delivered. Additionally and/or alternatively, the present invention may provide dynamic identification of a cluster of two or more mobile devices, based on relative displacement of among the mobile devices, and delivery of appropriate advertisements. Additionally and/or alternatively, the present invention may provide phone-based (i.e., SMS, MMS, etc.) advertisements to be delivered to a cluster of people that are in close proximity to one another (e.g., a group of friends sitting together at a restaurant). When such a cluster of people with phones is identified (via a P2P network, for example), then an advertising message targeted to that group can be sent. Additionally and/or alternatively, the present invention may identify a cluster of mobile devices dynamically based on a limited relative displacement for a particular minimum or threshold amount of time.

Additionally and/or alternatively, the present invention may provide a method or system of delivering advertisements based on grouping of mobile phone users in a mobile network. Additionally and/or alternatively, the present invention may provide dynamically identifying mobile phone users that can be grouped or clustered together based on profiles, patterns, and information obtained from P2P networks and/or delivering appropriate advertisements to the identified group on their mobile phones based on factors like overall speed of the group, location of the group, number of users in the group, time of the day, etc. Additionally and/or alternatively, the present invention may provide a method of identifying mobile phone users that can be grouped or clustered based on patterns, information from network and profiles and accordingly delivering advertisements to group of mobile users based on duration, time of day and relative distance between mobile users and location of the group.

The advertising message may be relevant to goods or services for two or more consumers. Additionally and/or alternatively, the advertising message relevant to the number of mobile devices in the cluster. In some embodiments, the advertising message may be provided by a third party or advertisement provider, such as an advertiser or an ad agency.

Figure 3:
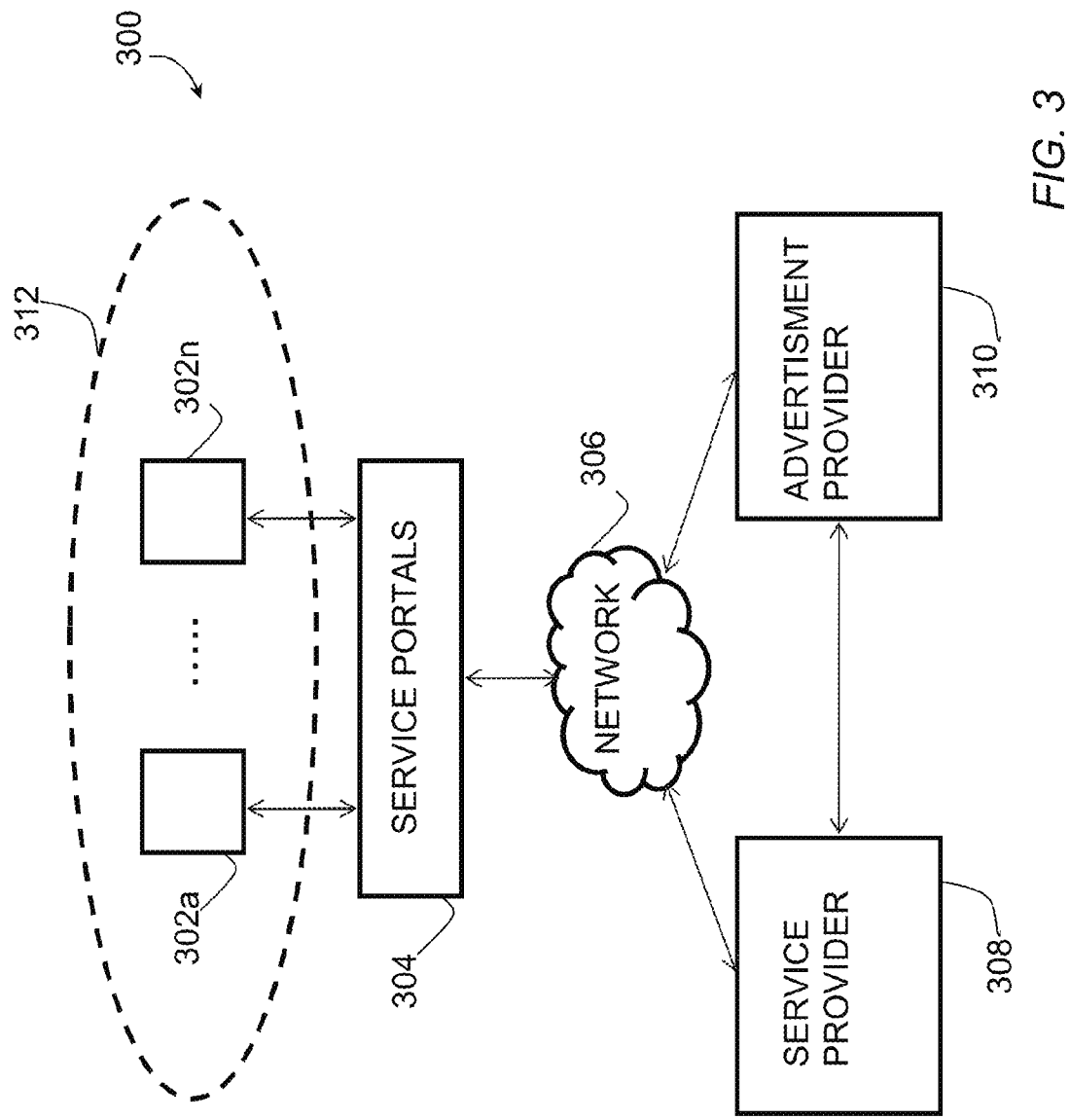
FIG. 3 is a block diagram of an example of a system in which illustrative embodiments may be implemented.

FIG. 3 illustrates a system for advertisement delivery to a cluster of mobile devices in accordance with various exemplary embodiments. A system 300 may include one or more mobile devices 302a-n, service portals 304, a network 306, a service provider 308, and/or an advertisement provider 310. Although elements of the system 300 may be described as a single device, it will be appreciated that multiple instances of these devices may be included in the system 300, such as, for example, multiple service providers, multiple advertisement providers, and multiple networks. A user may be associated with each mobile device 302 of the system 300. The mobile devices 302a-n may comprise a cluster 312 of two or more mobile devices 302. The service portals 304 may be located at disparate locations and/or communicatively coupled to the service provider 308 and/or the advertisement provider 310 via the network 306. The mobile devices 302a-n may each be communicatively coupled to the service provider 308 and/or the advertisement provider 310 via the service portals 304 located at disparate locations.

The mobile device 302 may be, for example, but not limited to, a cellular telephone, Session Initiation Protocol (SIP) phone, software client/phone, a desktop computer, a laptop/notebook, a server or server-like system, a module, a telephone, or a communication device, such as a personal digital assistant (PDA), a mobile phone, a smart phone, a remote controller, a personal computer (PC), a workstation, a mobile device, a phone, a handheld PC, a thin system, a fat system, a network appliance, and/or other mobile communication device that may be capable of transmitting and/or receiving data. Also, the mobile device 302 may include one or more transceivers to transmit and/or receive one or more signals to and/or from the service provider 308 and/or the advertisement provider 310.

The service portals 304 may be, for example, but not limited to, a cellular telephone network signal tower, an Internet service provider router, a telephone adapter, a telephone router, an Ethernet router, a satellite router, a fiber optic router, a co-axial cable router, an Internet router, and/or other routing device that may provide and/or determine a transmission path for data to travel. Further, the service portals 304 may include a computer, software, and/or hardware to facilitate a routing and/or forwarding function of a signal.

The network 306 may be a wireless network, a wired network, or any combination of wireless, wired, and/or other network capable of communicating electronic data from one point to another. For example, the network 306 may include, without limitation, wireless LAN (WLAN), Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11g and/or other wireless network. In addition, network 306 may include, without limitation, telephone line, fiber optics, IEEE Ethernet 802.3, long-range wireless radio, wide area network (WAN) such as WiMax, infrared, Bluetooth™, and/or other similar applications, local area network (LAN), or global network such as the Internet. Also, the network 306 may enable a wireless communication network, a cellular network, an Intranet, or the like, or any combination thereof. The network 306 may further include one or any number of the exemplary types of networks mentioned above operating as a stand-alone network or in cooperation with each other. For example, the network may include a Peer-to-peer (P2P) network.

The service provider 308 may include one or more service providers for providing voice and/or data service over, for example, an Internet Protocol (IP) network and/or a public switch telephone network (PSTN). For example, the service provider 308 may carry telephony signals (e.g., digital audio) encapsulated in a data packet stream over the Internet Protocol (IP) network. The service provider 308 may provide direct inward dialing (DID) Voice over Internet Protocol (VoIP) services, SIP services, and/or access a service. For example, the service provider 308 may include one or more computer systems and/or processors to provide services for the mobile devices 302a-n and/or the mobile devices 104a-n. The service provider 308 may include a memory, for example to store a database storing user profiles or user profile information of a plurality of mobile devices, and/or a server.

The advertisement provider 310 may include one or more advertisement providers for communicating advertising messages to the cluster 312 of mobile devices. For example, the advertisement provider 310 may include one or more computer systems and/or processors to provide advertisements to the mobile devices 302a-n. The advertisement provider 310 may communicate with the mobile devices 302a-n and/or the service provider 308 in any way, such as over an IP network. The service provider 308 may include a memory and/or a server.

The mobile device 302 may communicate with any component or entity depicted in FIG. 3 in any manner, including directly or via one or more networks, such as the network 306. For example, the mobile device 302 may connect first to the network 306 and then to one or more service portals (not shown) to reach the service provider 308 and/or the advertisement provider 310. The mobile device 302 may also communicate with the service provider 308 and/or the advertisement provider 310 via a WLAN bypassing a cell tower, for example.

In various exemplary embodiments, the service provider 308 may identify the cluster 312 of mobile devices 302a-n to receive an advertising message. For example, the service provider 308 may dynamically identify the cluster 312 of mobile devices 302a-n by determining a relative displacement of the two or more mobile devices 302a-n during a period of time to be less than a maximum relative displacement. Additionally and/or alternatively, the service provider 308 may dynamically identify the cluster 312 of mobile devices 302a-n by determining a distance between the two or more mobile devices to be less than a maximum distance. Additionally and/or alternatively, the identification may be based at least in part on the distance between the two or more mobile devices 302a-n being below a maximum distance for a threshold duration of time.

One or more of the maximum relative displacement and the maximum distance may include a preset value of distance. For example, the maximum relative displacement may be approximately zero and/or the maximum distance may be less than ten feet, one or both of which may indicate that the two or more mobile devices 302a-n are together and/or staying within vicinity of each other. One or more of the period of time and/or the threshold duration of time may include a preset value of time. For example, one or both of the period of time and/or the threshold duration of time may include thirty minutes, which may indicate that the gathering of the two or more mobile devices 302a-n is more than coincidental.

In some embodiments, the service provider 308 may identify the cluster 312 based at least in part on a common user profile factor of the two or more mobile devices 302a-n. For example, the common user profile factor may include having the same profession, being within the same age range, and/or any other factors known to those skilled in the art.

Figure 5:
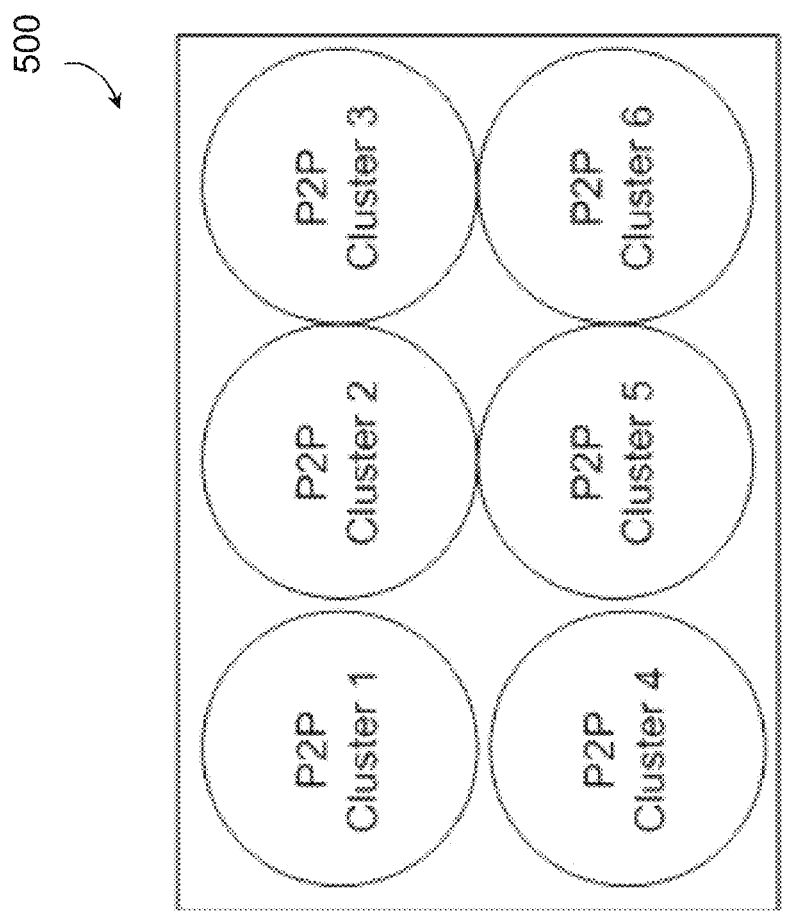
FIG. 5 is a pictorial representation of an example of a plurality of clusters within a Peer to Peer network.
Figure 4:
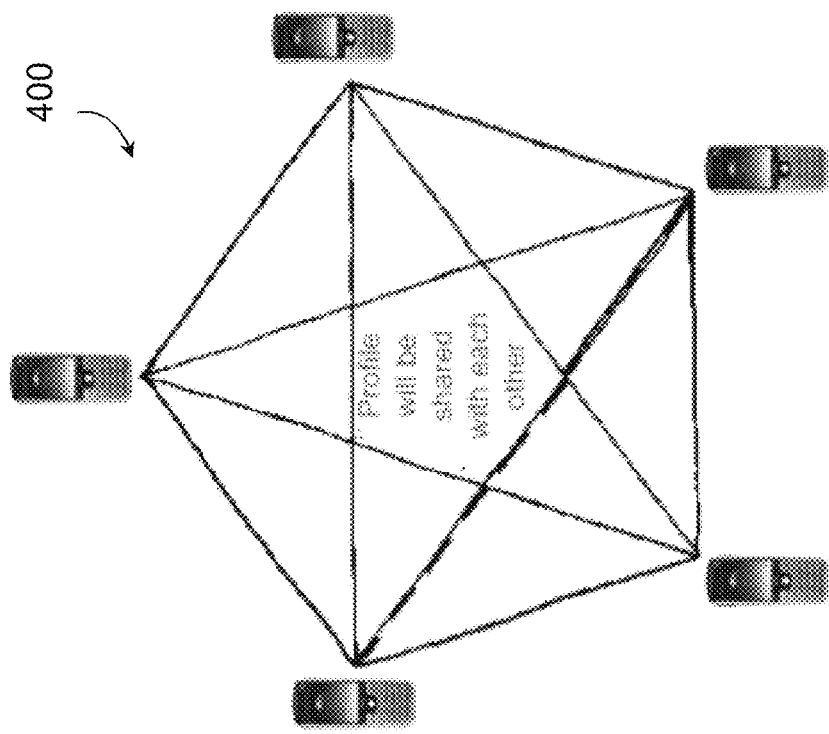
FIG. 4 is a pictorial representation of an example of a Peer to Peer network.

Additionally and/or alternatively, the mobile devices 302a-n may be part of a P2P network and the identification may be based at least in part on the membership in the P2P network. For example, a data mining cluster technique may be used to identify pattern of any P2P network and appropriate advertisement will be delivered based on the identified pattern of the P2P network. The service provider 308 server may gather following information from any P2P network and then a pattern may be identified, including one or more of: number of devices found in a P2P network, common user Profile of the identified devices, location of the identified P2P network, time of P2P network formation and/or duration of P2P network. FIG. 4 is a diagram of an exemplary P2P network 400 in which each mobile device has a profile. The profiles may be shared (in social networking channel). FIG. 5 is a diagram of exemplary clusters 500 in a P2P network. Each cluster 1-6 may include a group of two or more mobile devices in the P2P network having some common factor. The cluster may be identified based at least in part on the common factor.

The service provider 308 may capture data regarding the cluster 312, including but not limited to location of the cluster 312, number of mobile devices 302a-n in cluster 312, time of day of cluster 312, the time of cluster 312 formation, a common user profile factor of the cluster 312, a movement speed of cluster 312 and/or duration of cluster 312.

The service provider 308 may determine a movement speed of the cluster 312. If the cluster 312 is static, movement speed is zero, for example, than the users of the mobile devices 302a-n are likely to be sitting in a place. If the cluster 312 is moving, than the users of the mobile devices 302a-n are likely to be traveling. For example, if the movement speed is approximately 30 miles per hour (MPH) than the cluster 312 is likely to be in a vehicle. If the movement speed is approximately 5 MPH than the cluster 312 is likely to be walking. The movement speed and/or location of the cluster 312 may be used to determine a projected location of the cluster 312. For example, the service provider 308 may determine a projected location of the cluster 312 at a movement speed of X, starting at a location Y, after a period of time Z.

In some embodiments, the advertising message may be relevant to the movement speed of the cluster, for example an advertising message for two drinks for the price of one at a gas station if the movement speed is typical of a moving vehicle. Additionally and/or alternatively, the advertising message may be relevant to the projected location of the cluster, for example if the projected location is within the vicinity of a movie theater, than an advertising message for purchasing two movie tickets for the price of one.

To determine the location of a particular mobile device 302, the location of the particular mobile device 302 relative to another mobile device, the distance between two or more mobile devices 302a-n, a movement speed of mobile device 302 and/or a relative displacement of the two or more mobile devices 302a-n, the service provider 308 may receive location information for the mobile device 302, which may indicate a current location of the mobile device 302.

Various network-based location mechanisms known to those skilled in the art may be used to determine the location of a mobile device 302. Various mobile device based location mechanisms may also be used to determine the location of a mobile device 302. One example may be the global positioning system (GPS), which allows devices, such as various types of mobile devices that include a GPS receiver, to determine their current geographic position.

As depicted in FIG. 3, the service provider 308 may provide information and/or data regarding the cluster 312 to the advertisement provider 310. The advertisement provider 310 server may receive data regarding the cluster 312 of mobile devices 302a-n. The advertisement provider 310 may generate an advertising message. For example, the advertising message may be relevant to goods or services for two or more consumers, such as a package deal, a two-for-one offer, product or service bundles, and/or other advertising messages known to those skilled in the art. Generating the advertising message may include applying a conditional rule to the data. A conditional rule may include an IF . . . THEN . . . ELSE . . . EXCEPTION logic. The advertisement provider 310 may include an advertisement metadata server to generate and/or apply the conditional rule.

The advertisement provider 310 may send to the service provider 308 an advertising message. The service provider 308 may receive the advertising message and/or may display the advertising message on each of the mobile devices 302a-n in the cluster 312.

In the various exemplary embodiments, other devices, entities, or components may perform the functions of the service provider 308 and/or perform the functions of the advertisement provider 310 as described herein. For example, the advertisement provider 310 may identify a cluster 312 of mobile devices 302a-n, determine data information for the cluster 312, and/or display an advertising message on each of the mobile devices 302a-n in the cluster 312.

In one embodiment, the service provider 308 may monitor all mobile devices in a particular network and dynamically determine that a particular cluster 312 of mobile devices 302a-n has a relative displacement, for example during a period of time, is less than a maximum relative displacement. In another embodiment, the service provider 308 may monitor all mobile devices in a particular network and dynamically determine that the distance between mobile devices 302a-n is less than a maximum distance for a threshold duration of time or in other words, the mobile devices are together for a threshold time limit.

Figure 6:
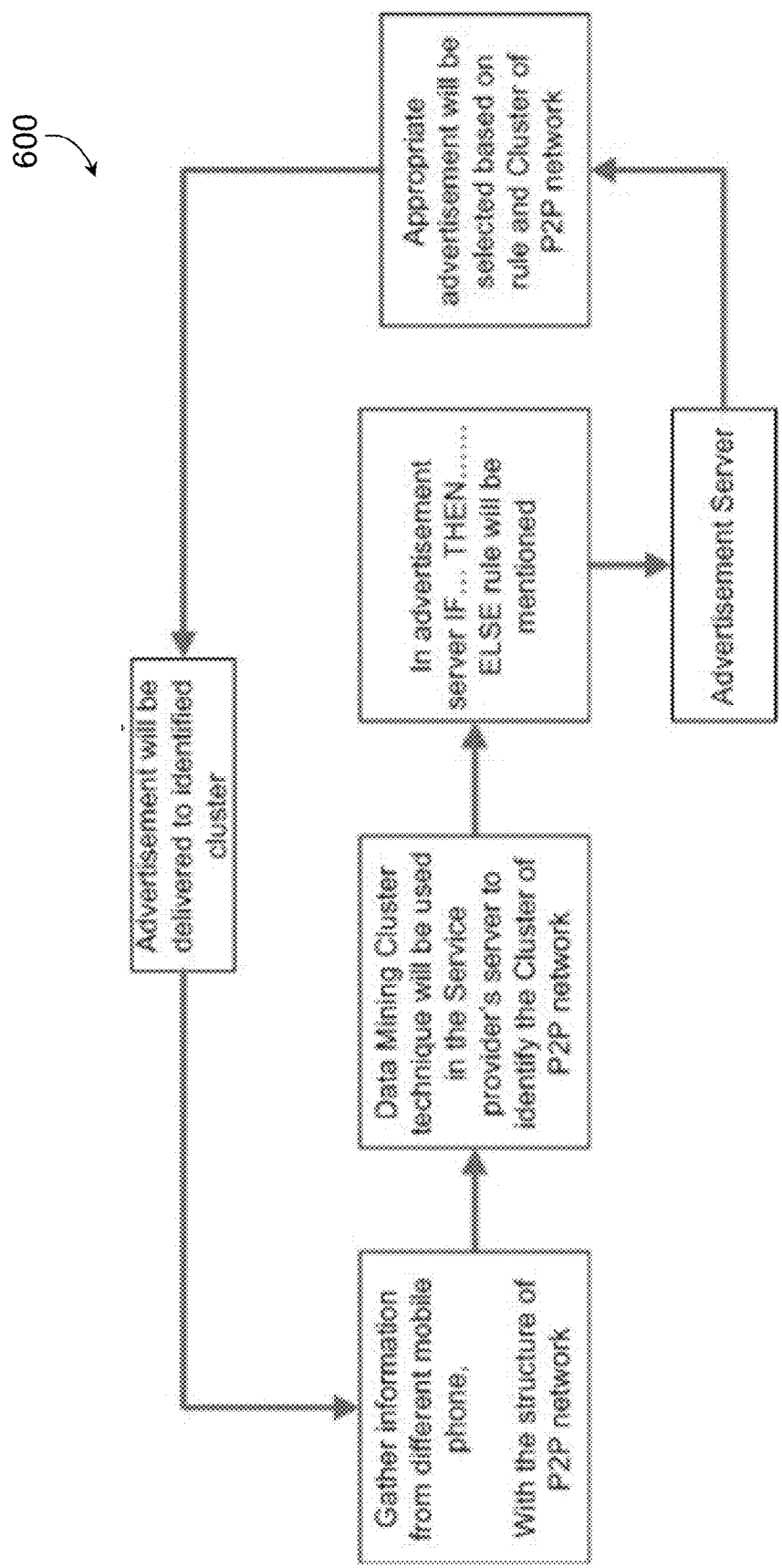
FIG. 6 is an example of a flow chart of advertisement delivery to a cluster of mobile devices.

The invention described herein may further be described as follows, with reference to flow diagram 600 in FIG. 6: Within a P2P network, every mobile device may gather sharable user profile information. At the same time, the mobile device may capture the date and time of the P2P network formation. A mobile phone tower may gather location of the mobile device and/or speed of the mobile device. All information will be analyzed in a mobile phone provider's server. A data mining clustering model may be used. The identified cluster may be validated in an advertisement metadata server. In advertisement metadata servicer, a cluster based advertisement will be determined with IF . . . THEN . . . ELSE . . . EXCEPTION logic. Once appropriate advertisement is found for the identified cluster, the advertisement may be delivered with SMS/MMS.

Figure 7:
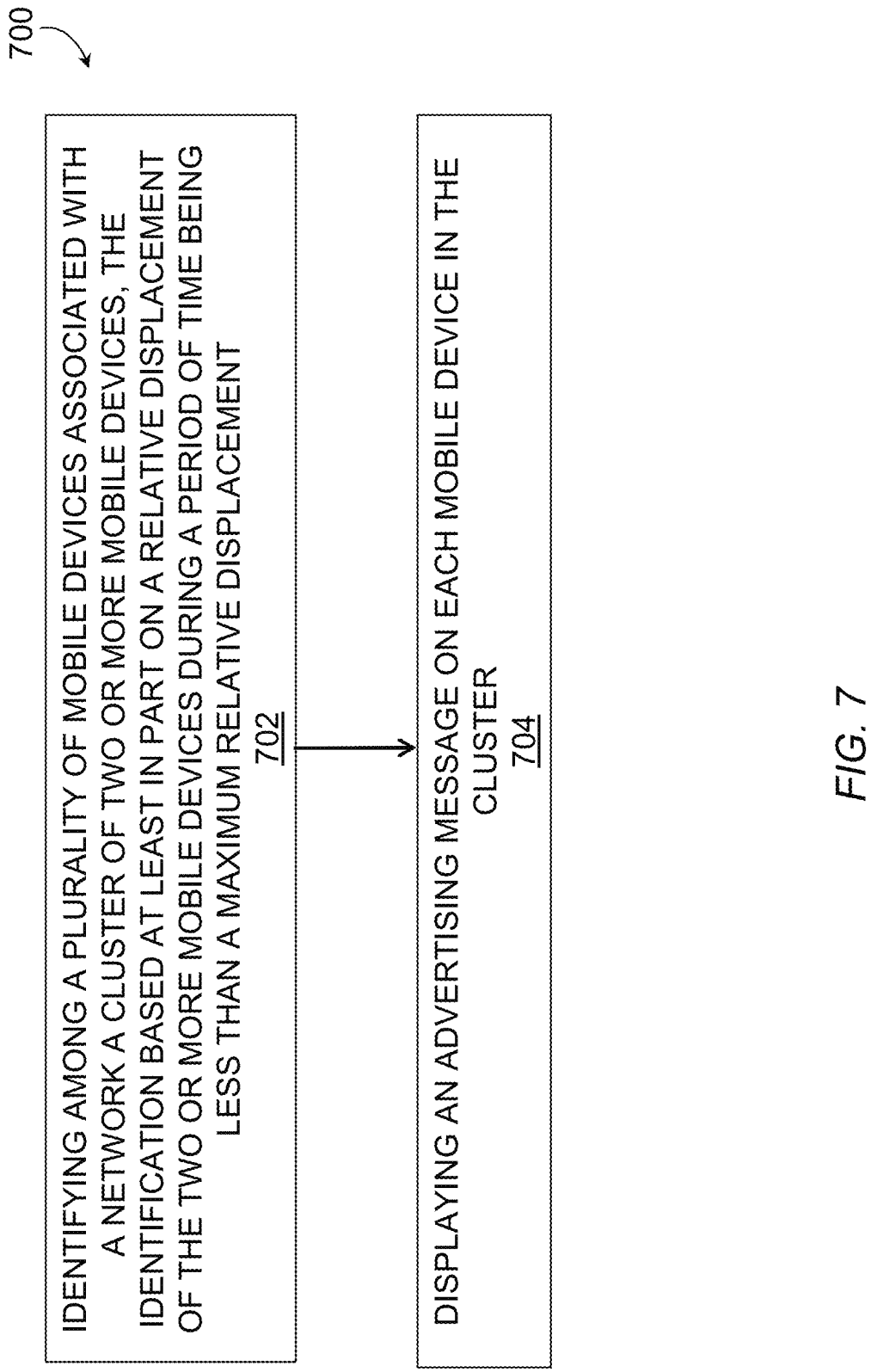
FIG. 7 is an example of a method of advertisement delivery to a cluster of mobile devices.

Referring now to FIG. 7, an example of a method 700, implemented in a computer system, of advertisement delivery to a cluster of mobile devices is provided. While FIG. 7 shows exemplary steps of a method according to one embodiment, other embodiments may omit, add to, and/or modify any of the steps shown in that figure. In step 702, a cluster of two or more mobile devices may be identified among a plurality of mobile devices associated with a network. The identification may be based at least in part on a relative displacement of the two or more mobile devices during a period of time being less than a maximum relative displacement. In step 704, an advertising message may be displayed on each mobile device in the cluster.

Method 700 may include other steps. For example, method 700 may include capturing data regarding the cluster, the data including at least one of a time of day and a location of the cluster, sending the data to a server and/or receiving the advertising message from the server. The advertising message may be relevant to goods or services for two or more consumers. Some embodiments of the method 700 may include determining a movement speed of the cluster, wherein the advertising message is relevant to the speed of the cluster. Some embodiments of the method 700 may include determining a movement speed of the cluster and determining a projected location of the cluster, wherein the advertising message is relevant to the projected location of the cluster.

Additionally and/or alternatively, some embodiments of method 700, wherein the network includes a peer-to-peer network, the identification may be based at least in part on a common user profile factor of the two or more mobile devices. Additionally and/or alternatively, the identification of the cluster may include determining a distance between the two or more mobile devices to be less than a maximum distance.

Figure 8:
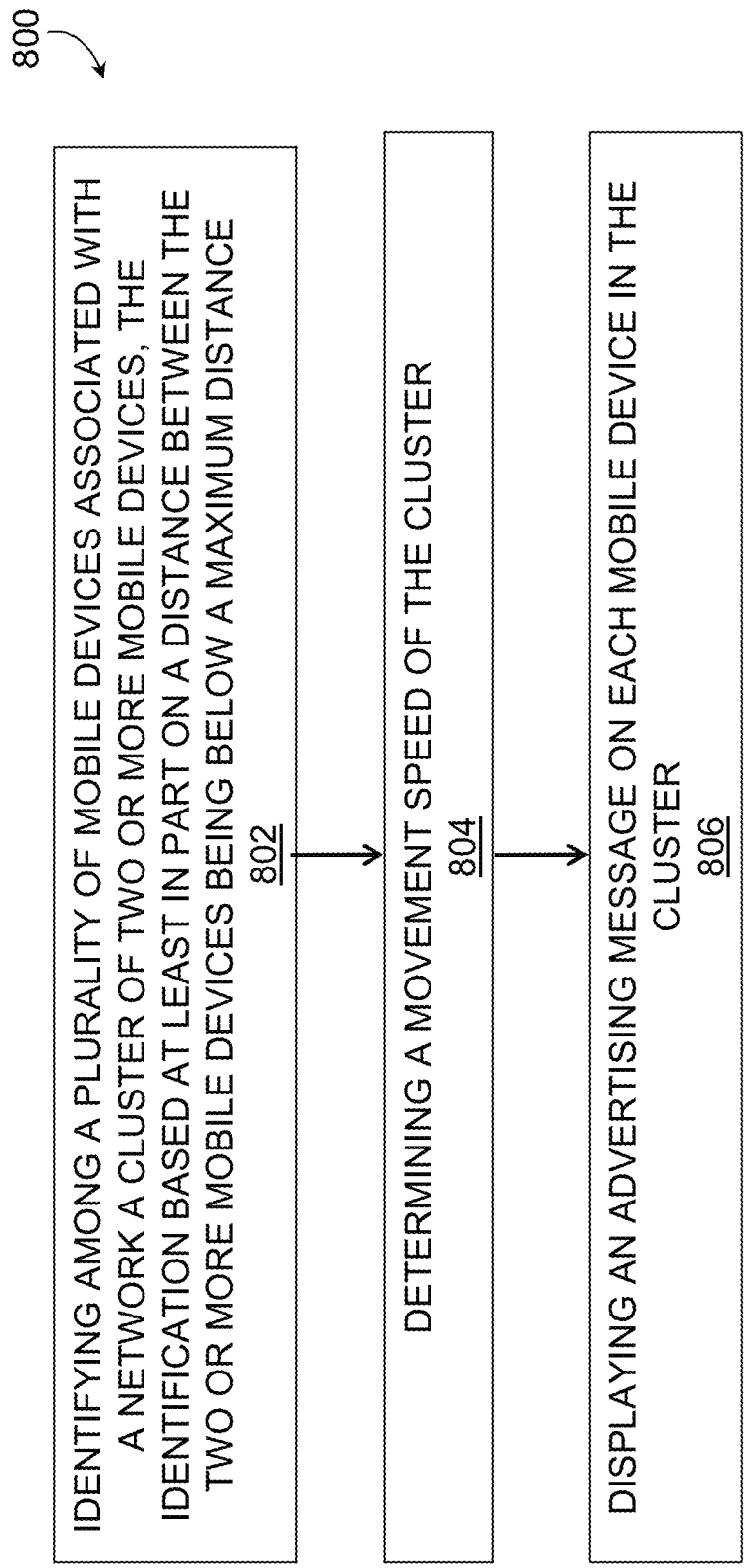
FIG. 8 is an example of a method of advertisement delivery to a cluster of mobile devices.

Referring now to FIG. 8, a further example of a method 800, implemented in a computer system, of advertisement delivery to a cluster of mobile devices is shown. While FIG. 8 shows exemplary steps of a method according to one embodiment, other embodiments may omit, add to, and/or modify any of the steps shown in that figure. In step 802, a cluster of two or more mobile devices may be identified among a plurality of mobile devices associated with a network. The identification may be based at least in part on a distance between the two or more mobile devices being below a maximum distance. In step 804, a movement speed of the cluster may be determined. In step 806, an advertising message may be displayed on each mobile device in the cluster.

Method 800 may include other steps. For example, method 800 may include accessing a database storing user profiles of the plurality of mobile devices and determining a common user profile factor of the two or more mobile devices. The identification of the cluster may be based at least in part on the common user profile factor. Additionally and/or alternatively, the identification may be based at least in part on the distance between the two or more mobile devices being below a maximum distance for a threshold duration of time. Some embodiments of the method 800 may include capturing data regarding the cluster, the data including one or more of the time of day and the location of the cluster.

Referring now to FIG. 9, a further example of a method 900, implemented in a computer system, of advertisement delivery to a cluster of mobile devices is shown. While FIG. 9 shows exemplary steps of a method according to one embodiment, other embodiments may omit, add to, and/or modify any of the steps shown in that figure. In step 902, data regarding a cluster of mobile devices may be received at a server. The cluster may include two or more mobile devices associated with a network having a relative displacement less than a maximum relative displacement for a threshold duration of time. In step 904, an advertising message relevant to goods or services for two or more consumers may be generated. In step 906, the advertising message may be sent to a mobile device service provider server for display on each of the mobile devices in the cluster.

Method 900 may include other steps. For example, the data may include a movement speed of the cluster. Additionally and/or alternatively, method 900 may include generating the advertising message may include applying a conditional rule to the data.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

An example of a pattern in a P2P network is provided below:

P2P network Software identified that a group of 5/6 persons (or mobile device users) of 18-22 age group (from individual profile file share) are together. This said cluster is together for 1 hr (Duration of the formed cluster), it is formed near a big shopping complex (Location of the Cluster). This P2P network cluster formed at 6:00 pm (Time of P2P network formation).

Once the Cluster of the P2P network is identified, an advertising message, such as a Pizza advertisement can be delivered to each member of that group. Here the advertisement could be "Two big Pizza with 2 liter free cold drink free." As it identified a group of ⅚ people, so two big pizza and 2 liters of cold drink is sufficient. This advertisement may not be appropriate for a single person, but it is appropriate for a group of ⅚ people. It is in the evening time, so the identified group can plan a pizza dinner.

Following are some patterns of clustered P2P network:
If Cluster is static then—the user are sitting in a place.
If Cluster is static moving—the users travelling
If the Duration of Cluster life is less than 5 minutes, then it is a possible gathering where people are moving Accordingly, sellers can sell products and/or services to multiple people (group of people), in this case the cluster of different group will be identified and then appropriate advertisement (to sell to two or more consumers) will be delivered to the identified cluster.

Also the group of people may have a common goal or "stated goal" that may be provided by the user and/or determined by the service provider or the advertisement provider, (e.g. possible use for Taxi sharing, so four people in proximity want to go to same destination or other "stated goal") can use the invention.

The present invention may further be described as follows:

A Cluster of mobile phone users may be identified dynamically based on the following parameters:

a. Relative displacement between two or among multiple mobile phone are zero or very minimum. It means the group of people are moving together b. The mobile phone cluster will be identified if the number of mobile phone users are together for a threshold time limit.

A Pattern of mobile phone Cluster may be based on the following information, and accordingly the Cluster of mobile phone may be grouped with one or more subcategories a. Speed of the Cluster—Is the Cluster Static (Speed is Zero) or moving, Static cluster mean the user are gathered in a place, moving mean they are travelling together.

b. Location of Cluster—Where the cluster is located, e.g. the cluster is located near the shopping complex.

c. Number of members in the Cluster d. How long the Cluster is present, e.g. The Cluster is Created one hr. back, e. What time the Cluster was formed e.g. in the Evening time.

f. Common User Profile will also be considered to create the Cluster, e.g. all the members are doctors, A Metadata rule based Dynamic Advertisement (SMS/MMS/file Share etc) may be sent to the identified cluster in mobile telephonic network. In this case, the advertisement may be targeted for a group of people in the Cluster. Not to a single person.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
identifying among a plurality of mobile devices associated with a network a cluster of two or more mobile devices, the identification of the cluster by a computing device in communication with the two or more mobile devices, the identification based at least in part on a distance between the two or more mobile devices being below a maximum distance, on a relative displacement of the two or more mobile devices being less than a maximum relative displacement for a threshold duration of time, and on the two or more mobile devices being connected together in a peer-to-peer network;
determine a movement speed of the cluster of two or more mobile devices; and
displaying an advertising message on each mobile device in the cluster that is relevant to the speed of the cluster, wherein the advertising message differs based on the speed of the cluster.

2. The method of claim 1, further comprising
capturing data regarding the cluster, the data including at least one of a time of day and a location of the cluster;
sending the data to a server; and
receiving the advertising message from the server, the advertising message relevant to goods or services for two or more consumers.

3. The method of claim 1, wherein:
and the identification is based at least in part on a common user profile factor of the two or more mobile devices.

4. The method of claim 1, further comprising:
determining a projected location of the cluster, wherein the advertising message is relevant to the projected location of the cluster.

5. The method of claim 1, further comprising:
accessing a database storing user profiles of the plurality of mobile devices; and
determining a common user profile factor of the two or more mobile devices within the cluster.

6. The method of claim 5,
wherein the identification of the cluster is based at least in part on the common user profile factor.

7. A method, comprising:
receiving at a server data regarding a cluster of mobile devices, the cluster including two or more mobile devices associated with a network having a distance between the two or more mobile devices being below a maximum distance and having a relative displacement less than a maximum relative displacement for a threshold duration of time, the identification of the cluster by a computing device in communication with the two or more mobile devices, the identification based at least in part on the two or more mobile devices being connected together in a peer-to-peer network;
determining a movement speed of the cluster of two or more mobile devices;
generating an advertising message relevant to goods or services for two or more consumers that is relevant to the speed of the cluster, wherein the advertising message differs based on the speed of the cluster; and
sending the advertising message to a mobile device service provider server for display on each of the mobile devices in the cluster.

8. The method of claim 7, wherein:
generating the advertising message includes applying a conditional rule to the data.

* * * * *